(12) United States Patent
Wang

(10) Patent No.: US 12,445,168 B2
(45) Date of Patent: Oct. 14, 2025

(54) DISPLAY APPARATUS AND CONTROL METHOD THEREOF

(71) Applicants: Chengdu BOE Optoelectronics Technology Co., Ltd., Sichuan (CN); BOE Technology Group Co., Ltd., Beijing (CN)

(72) Inventor: Wei Wang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/025,627

(22) PCT Filed: Mar. 31, 2022

(86) PCT No.: PCT/CN2022/084283
§ 371 (c)(1),
(2) Date: Mar. 9, 2023

(87) PCT Pub. No.: WO2023/184299
PCT Pub. Date: Oct. 5, 2023

(65) Prior Publication Data
US 2024/0291516 A1    Aug. 29, 2024

(51) Int. Cl.
*H04B 5/43*    (2024.01)
*H04B 5/26*    (2024.01)
(Continued)

(52) U.S. Cl.
CPC ............... *H04B 5/263* (2024.01); *H04B 5/43* (2024.01); *H04M 1/0277* (2013.01);
(Continued)

(58) Field of Classification Search
CPC ....... H04B 5/263; H04B 5/43; H04M 1/0277; H04M 2250/04; H05K 1/189; H05K 9/0081; H05K 2201/10128
See application file for complete search history.

(56) References Cited

U.S. PATENT DOCUMENTS 10,970,698 B1 *  4/2021  Binder ................... H04B 5/263
11,073,958 B2 *  7/2021  Yamagishi ............... H01Q 7/00
(Continued)

FOREIGN PATENT DOCUMENTS

CN       102646866 A    8/2012
CN       106406721 A    2/2017
(Continued)

*Primary Examiner* — Cindy Trandai
(74) *Attorney, Agent, or Firm* — IPro, PLLC

(57) ABSTRACT

The present disclosure discloses a display apparatus and a control method thereof. The display apparatus includes: a display panel, a first flexible circuit board and a main control panel. The main control panel is electrically connected with the display panel through the first flexible circuit board, and the first flexible circuit board is arranged on a back surface of the display panel. The display apparatus further includes: a second flexible circuit board, including a base material layer and a plurality of antenna coils arranged on a side of the base material layer, and each antenna coil corresponds to a detection region; and a near field communication circuit, located on a circuit board different from the second flexible circuit board, wherein the near field communication circuit selects one of the plurality of antenna coils for use at the same moment.

16 Claims, 12 Drawing Sheets

(51) Int. Cl.
*H04M 1/02* (2006.01)
*H05K 1/18* (2006.01)
*H05K 9/00* (2006.01)

(52) U.S. Cl.
CPC ........... *H05K 1/189* (2013.01); *H05K 9/0081* (2013.01); *H04M 2250/04* (2013.01); *H05K 2201/10128* (2013.01)

(56) References Cited

U.S. PATENT DOCUMENTS

| | | | |
|---|---|---|---|
| 2014/0125533 A1* | 5/2014 | Shi | H01Q 1/44 29/601 |
| 2014/0179224 A1* | 6/2014 | Liao | G04G 17/045 455/41.1 |
| 2015/0116296 A1* | 4/2015 | Greene | H04B 5/266 345/211 |
| 2017/0031499 A1 | 2/2017 | Terada et al. | |
| 2017/0214132 A1* | 7/2017 | Jeon | G06Q 20/3278 |
| 2017/0272127 A1 | 9/2017 | Jang et al. | |
| 2017/0324147 A1* | 11/2017 | Lee | H01Q 21/30 |
| 2017/0330188 A1* | 11/2017 | Canh | H04L 63/0838 |
| 2017/0338559 A1 | 11/2017 | Cheikh et al. | |
| 2018/0011671 A1* | 1/2018 | Yamaguchi | G06Q 30/02 |
| 2018/0301790 A1* | 10/2018 | Kim | H05K 1/165 |
| 2019/0372625 A1 | 12/2019 | Ueno et al. | |
| 2020/0058015 A1* | 2/2020 | Lee | H04B 5/26 |
| 2020/0175498 A1* | 6/2020 | Lee | G06Q 20/3278 |
| 2020/0192542 A1 | 6/2020 | Chang et al. | |
| 2021/0066802 A1* | 3/2021 | Liu | H04B 5/26 |
| 2021/0092528 A1* | 3/2021 | Lee | H04R 3/00 |
| 2021/0218439 A1 | 7/2021 | Lee et al. | |
| 2021/0280974 A1* | 9/2021 | Yum | H04B 5/263 |
| 2021/0314028 A1* | 10/2021 | Wobak | H02J 50/90 |
| 2022/0014233 A1 | 1/2022 | Chlestil | |
| 2022/0149669 A1* | 5/2022 | Kim | H01F 38/14 |
| 2022/0209581 A1* | 6/2022 | Kim | H02J 50/10 |
| 2022/0302756 A1* | 9/2022 | Lee | H05K 1/0203 |
| 2023/0058372 A1* | 2/2023 | Li | G06F 1/1698 |
| 2023/0091874 A1* | 3/2023 | Choi | H01Q 21/30 343/867 |
| 2023/0180448 A1 | 6/2023 | Wang et al. | |

FOREIGN PATENT DOCUMENTS

| | | |
|---|---|---|
| CN | 107221738 A | 9/2017 |
| CN | 110235135 A | 9/2019 |
| CN | 111312099 A | 6/2020 |
| CN | 111797947 A | 10/2020 |
| CN | 112384004 A | 2/2021 |
| CN | 112688721 A | 4/2021 |
| CN | 107453787 B | 6/2021 |
| CN | 113922845 A | 1/2022 |

\* cited by examiner

DISPLAY APPARATUS AND CONTROL METHOD THEREOF

CROSS-REFERENCE TO RELATED APPLICATIONS

This application is a National Stage of International Application No. PCT/CN2022/084283, filed Mar. 31, 2022, which is hereby incorporated by reference in its entirety.

FIELD

The present disclosure relates to the field of near field communication, in particular to a display apparatus and a control method thereof.

BACKGROUND

At present, a near field communication (NFC) antenna coil of a mobile phone is arranged on a back of the mobile phone.

When a communication connection with a communication target needs to be established, as a user cannot determine which position of the back of the mobile phone the NFC antenna coil is located, a position corresponding to the communication target needs to be changed frequently, consequently, connection with the communication target cannot be established in time, and a success rate of recognizing the communication target is low.

SUMMARY

In a first aspect, in order to solve the above technical problem, the display apparatus provided by an embodiment of the present disclosure includes a display panel, a first flexible circuit board and a main control panel, wherein the main control panel is electrically connected with the display panel through the first flexible circuit board, the first flexible circuit board is arranged on a back face of the display panel, and the display apparatus further includes: a second flexible circuit board, including a base material layer and a plurality of antenna coils arranged on a side of the base material layer, wherein each antenna coil corresponds to a detection region; and a near field communication circuit, located on a circuit board different from the second flexible circuit board, wherein the near field communication circuit selects one of the plurality of antenna coils for use at the same moment.

In a possible implementation, the second flexible circuit board is arranged on a side of the first flexible circuit board close to the display panel.

In a possible implementation, coil specifications of the plurality of antenna coils are the same, and each coil specification includes a size of a coil, the number of turns of the coil, spacing of adjacent inner coil and outer coil, or a leading-out position of the coil.

In a possible implementation, orthographic projections of the plurality of antenna coils on the base material layer do not overlap and are symmetrical relative to a center line of the plurality of antenna coils, the center line is a straight line passing through a geometric center defined by the plurality of antenna coils in a first direction, and the first direction is perpendicular to an arrangement direction of the plurality of antenna coils.

In a possible implementation, the plurality of antenna coils are located on the same surface of the base material layer, or the plurality of antenna coils are distributed on two surfaces of the base material layer.

In a possible implementation, metal bonding pads of the plurality of antenna coils are close to the geometric center of the plurality of antenna coils and are symmetrical relative to the center line.

In a possible implementation, the display apparatus further includes: a shielding layer, stacked between the first flexible circuit board and the second flexible circuit board and configured to shield electromagnetic interference between the first flexible circuit board and the plurality of antenna coils.

In a possible implementation, the first flexible circuit board includes: a plurality of antenna bonding pads, arranged on a surface of a side of the first flexible circuit board away from the second flexible circuit board, wherein one surfaces of the antenna bonding pads close to the second flexible circuit board are electrically connected with the corresponding antenna coils, and one surfaces of the antenna bonding pads away from the second flexible circuit board are electrically connected with the near field communication circuit; and a plurality of connecting holes, being in one-to-one correspondence with the plurality of antenna bonding pads, wherein the connecting holes penetrate through circuit boards between the corresponding antenna bonding pads and the metal bonding pads.

In a possible implementation, the near field communication circuit includes: a selective switch, wherein a plurality of first ends of the selective switch are electrically connected with the plurality of antenna coils respectively; and a near field communication chip, wherein a signal end of the near field communication chip is electrically connected with a second end of the selective switch, a signal control end of the near field communication chip is electrically connected with a controlled end of the selective switch, the near field communication chip outputs a selective signal to the selective switch through the signal control end, and thus the selective switch is electrically connected with the selected antenna coil corresponding to the selective signal, and the signal end.

In a possible implementation, the near field communication circuit is arranged on the first flexible circuit board or the main control panel.

In a possible implementation, the near field communication circuit further includes: a differential matching circuit, wherein a first end of the differential matching circuit is electrically connected with the signal end of the near field communication chip, a second end of the differential matching circuit is electrically connected with a second end of a selective switch, and the differential matching circuit is configured to adjust impedance between the near field communication chip and the corresponding antenna coil electrically connected therewith.

In a second aspect, an embodiment of the present disclosure provides a control method of the display apparatus described as the first aspect, including: controlling a near field communication circuit to be electrically connected with an antenna coil of a corresponding discovery cycle in sequence in a discovery cycle corresponding to each antenna coil; controlling the near field communication circuit to implement a discovery process on a near field communication device in a discovery cycle of each antenna coil; determining that the near field communication device is located in a detection region of an antenna coil corresponding to any discovery cycle after the near field communication circuit discovers the near field communication device in any discovery cycle; and keeping the near field communication circuit electrically connected with the antenna coil corresponding to any discovery cycle, and forbidding other antenna coils from being electrically connected with the near field communication circuit till the near field communication device leaves; and controlling the near field communication circuit to communicate with the near field communication device.

In a possible implementation, before controlling the near field communication circuit to be electrically connected with the antenna coil of the corresponding discovery cycle in sequence in a discovery cycle corresponding to each antenna coil, the method further includes: arranging a corresponding discovery cycle for each antenna coil, wherein discovery cycles of the different antenna coils are the same or not.

In a possible implementation, the discovery cycle is an integral multiple of a reference discovery cycle, and the reference discovery cycle is the smallest discovery cycle corresponding to an antenna coil.

In a possible implementation, the controlling the near field communication circuit to implement a discovery process on a communication target in a discovery cycle of each antenna coil includes: the discovery cycle including a polling cycle and a monitoring cycle; controlling the near field communication circuit to send a polling signal to a surrounding near field communication device in the polling cycle; monitoring, in the monitoring cycle, whether a response signal of the polling signal is received; and determining that the near field communication device is discovered in the corresponding discovery cycle if the response signal is received.

In a possible implementation, the controlling the near field communication circuit to communicate with the near field communication device includes: controlling the near field communication circuit to communicate with a plurality of near field communication devices respectively in a mode of polling the plurality of near field communication devices if the plurality of near field communication devices are discovered in the corresponding discovery cycle.

DETAILED DESCRIPTION OF THE EMBODIMENTS

Embodiments of the present disclosure provide a display apparatus and a control method thereof so as to solve a technical problem of low success rate of recognizing a communication target in the prior art.

In order to better understand the above technical solution, the technical solution of the present disclosure is described in detail below through the accompanying drawings and specific implementations. It should be understood that the embodiments of the present disclosure and specific features in some embodiments are detailed description of the technical solution of the present disclosure instead of limiting the technical solution of the present disclosure. The embodiments of the present disclosure and technical features in some embodiments may be mutually combined without conflicts.

Figure 1:
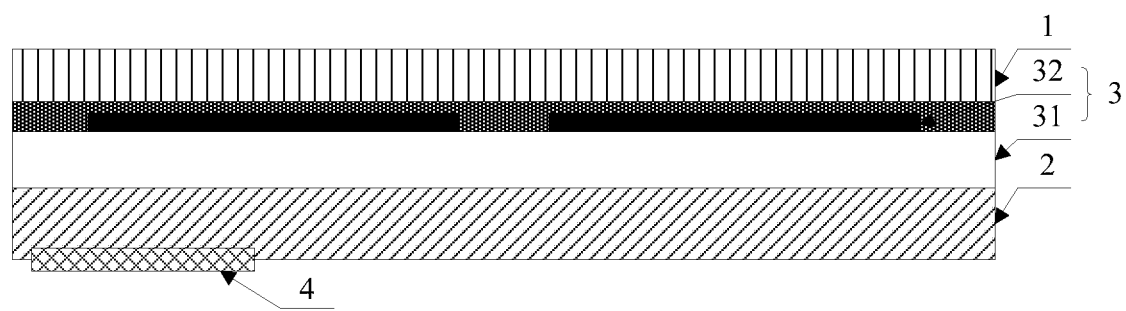
FIG. 1 is a schematic structural diagram of a display apparatus provided by an embodiment of the present disclosure.

Please refer to FIG. 1, which is a schematic structural diagram of a display apparatus provided by an embodiment of the present disclosure, the display apparatus includes:

a display panel 1, a first flexible circuit board 2 and a main control panel (not shown in FIG. 1). The main control panel is electrically connected with the display panel 1 through the first flexible circuit board 2, and the first flexible circuit board 2 is arranged on a back face of the display panel 1. The above display panel 1 may be a liquid crystal display panel 1, or may also be an organic light emitting diode (OLED) display panel 1, which is not limited specifically. The above first flexible circuit board 2 has a binding region bound to the display panel 1 and a device region for placing a device.

It needs to be noted that a connection relationship between the display panel 1 and the first flexible circuit board 2 and a connection relationship between the first flexible circuit board 2 and the main control panel are not shown in FIG. 1. In actual application, after the display panel 1 and the first flexible circuit board 2 are bound, the first flexible circuit board 2 is bent to the back face of the display panel 1, so a position relationship shown in FIG. 1 appears.

Figure 2:
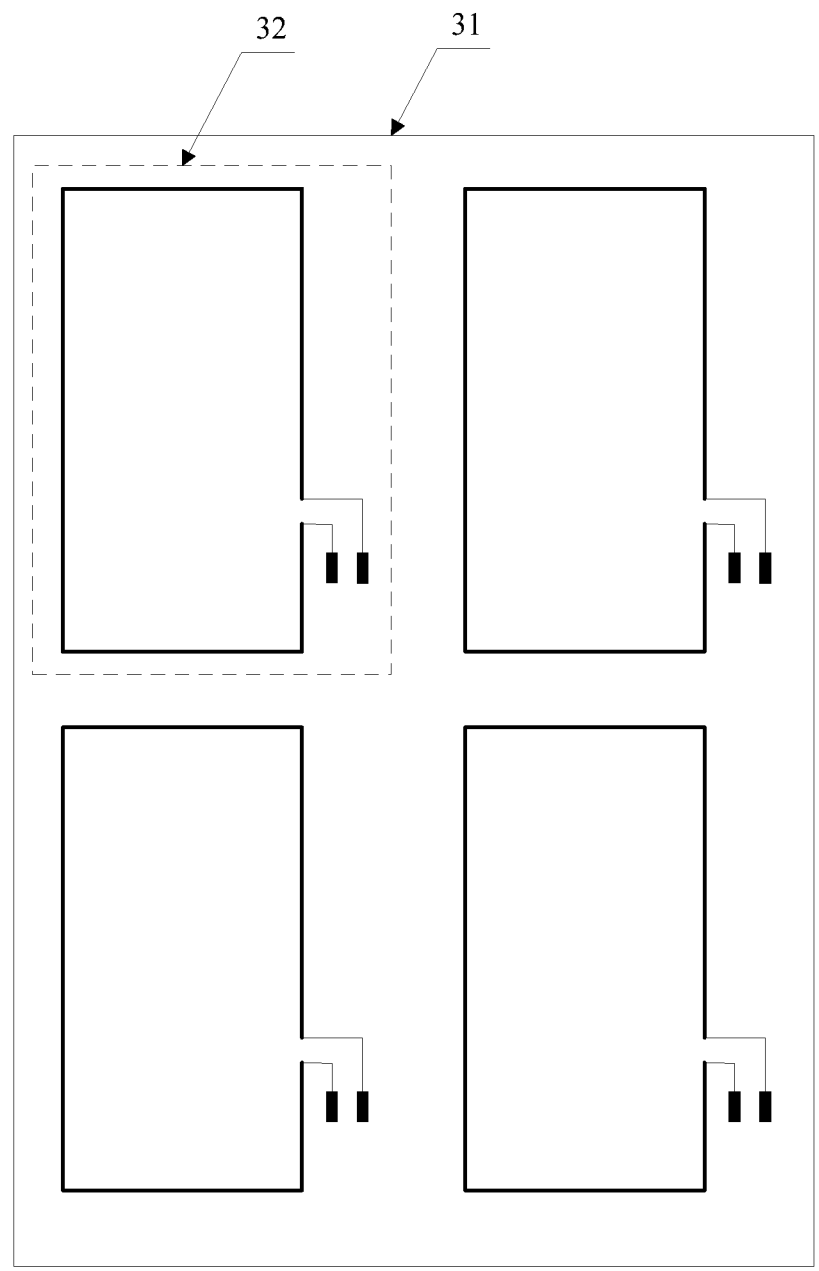
FIG. 2 is a schematic diagram of distribution of a plurality of antenna coils in a second flexible circuit board provided by an embodiment of the present disclosure.

The display panel 1 further includes a second flexible circuit board 3. The second flexible circuit board 3 includes a base material layer 31, and a plurality of antenna coils 32 arranged on a side of the base material layer 31, wherein each antenna coil 32 corresponds to a detection region. The second flexible circuit board 3 may be arranged on a side of the first flexible circuit board 2 close to the display panel 1, so that a signal launching direction of the antenna coils 32 may be arranged as a direction facing the display panel 1. The second flexible circuit board 3 may also be arranged on a side of the first flexible circuit board 2 facing away from the display panel 1, so that the signal launching direction of the antenna coils 32 may be arranged as a direction back on to the display panel 1. As shown in FIG. 2, which is a schematic diagram of distribution of a plurality of antenna coils in a second flexible circuit board provided by an embodiment of the present disclosure. FIG. 2 takes four antenna coils 32 being arranged in the second flexible circuit board 3 as an example, and the four antenna coils 32 may be uniformly distributed on a surface of the second flexible circuit board 3.

The display panel 1 further includes a near field communication circuit 4. The near field communication circuit is on a circuit board different from the second flexible circuit board 3, and the near field communication circuit 4 selects one of the plurality of antenna coils 32 for use at the same moment. The above near field communication circuit 4 may be, as shown in FIG. 1, arranged on a side of the first flexible circuit board 2 away from the second flexible circuit board 3, or may also be arranged on other circuit boards, such as in the main control panel in the display apparatus. The above near field communication circuit 4 may be an NFC circuit.

In some embodiments provided by the present disclosure, the plurality of antenna coils 32 are arranged in the second flexible circuit board 3 of the display apparatus, and the plurality of antenna coils 32 are controlled by using the same near field communication circuit 4, so that the near field communication circuit 4 selects one of the plurality of antenna coils 32 for use at the same moment, and a recognition area of near field communication can be effectively increased. As the recognition area of the near field communication is increased, when a user uses the above display apparatus to recognize a communication target, a relative position relationship between the communication target and the display apparatus does not need to be adjusted constantly like the related art, thus the communication target can be recognized fast and accurately, and a recognition accuracy of communication target is improved. Besides, as the plurality of antenna coils 32 use the same near field communication circuit 4, it is not needed to arrange one near field communication circuit 4 for each antenna coil 32 independently, and thus costs can be effectively reduced.

Figure 3:
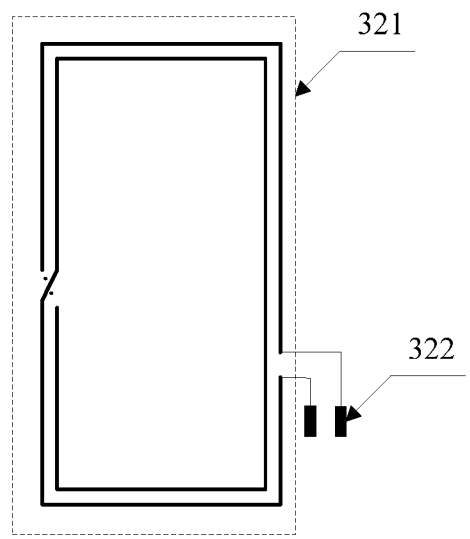
FIG. 3 is a schematic structural diagram of an antenna coil provided by an embodiment of the present disclosure.

As shown in FIG. 3, which is a schematic structural diagram of an antenna coil provided by an embodiment of the present disclosure. The antenna coil 32 includes:
  a metal wire 321, constituting at least one coil; and
  two metal bonding pads 322, electrically connected with two ends of the metal wire 321 respectively.

As shown in FIG. 1, the metal wire 321 of the antenna coil 32 may constitute one coil, or may constitute two coils as shown in FIG. 3, or may also constitute three or even more coils, but how many coils are constituted specifically is not limited here. The two ends of the above metal wire 321 are connected with the two metal bonding pads 322 respectively so as to be electrically connected with the near field communication circuit 4 through the two metal bonding pads.

Figure 4:
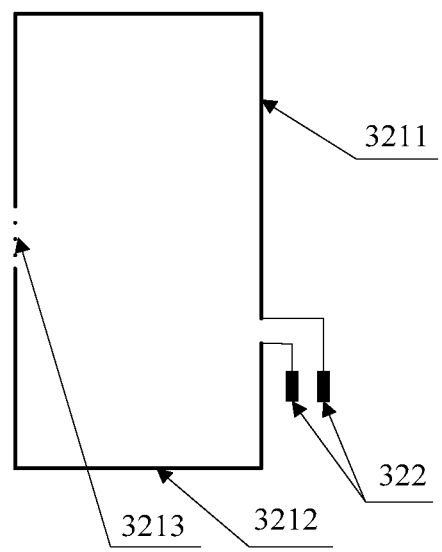
FIG. 4 is a schematic structural diagram of another antenna coil provided by an embodiment of the present disclosure.

As shown in FIG. 4, which is a schematic structural diagram of another antenna coil provided by an embodiment of the present disclosure.

When the metal wire 321 constitutes a plurality of coils, the metal wire 321 includes:

a first auxiliary metal wire 3211 and a second auxiliary metal wire 3212, electrically connected with the two metal bonding pads 322 respectively; and
  a metal jumper 3213, electrically connected with one ends of the first auxiliary metal wire 3211 and the second auxiliary metal wire 3212 away from the corresponding metal bonding pads 322 respectively. The metal jumper 3213 and at least one of the first auxiliary metal wire 3211 or the second auxiliary metal wire 3212 are arranged on different layers.

The first auxiliary metal wire 3211 and the second auxiliary metal wire 3212 are electrically connected with the two metal bonding pads 322 respectively, and two ends of the metal jumper 3213 are electrically connected with one ends of the first auxiliary metal wire 3211 and the second auxiliary metal wire 3212 away from the corresponding metal bonding pads 322 respectively, so that the antenna coil 32 with a plurality of coils may be formed.

Figure 5:
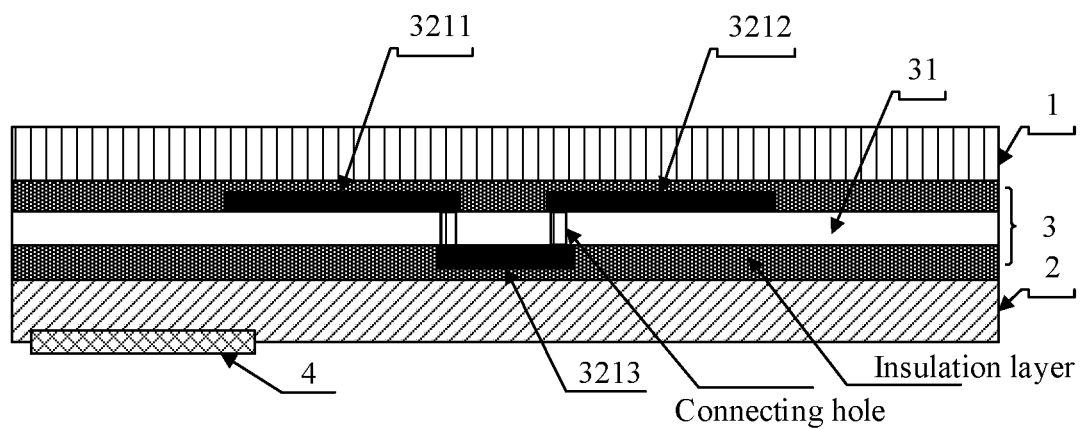
FIG. 5 is a schematic structural diagram of another antenna coil provided by an embodiment of the present disclosure.

As shown in FIG. 4, the first auxiliary metal wire 3211 and the second auxiliary metal wire 3212 may be arranged on the same layer, that is, the first auxiliary metal wire 3211 and the second auxiliary metal wire 3212 may be arranged on the same surface of the second flexible circuit board 3. Or, as shown in FIG. 5, which is a schematic structural diagram of another antenna coil provided by an embodiment of the present disclosure, the first auxiliary metal wire 3211 and the second auxiliary metal wire 3212 may also be arranged on different layers. In FIG. 4 and FIG. 5, the first auxiliary metal wire 3211 and the second auxiliary metal wire 3212 being located on different layers is illustrated by using different line types.

It needs to be noted that FIG. 4 is to conveniently observe that the first auxiliary metal wire 3211 and the second auxiliary metal wire 3212 of the antenna coil 32 containing one coil are arranged on the same layer, and the metal jumper 3213 is arranged on a layer different from that of them, but in actual application, the antenna coil 32 containing one coil is arranged actually as shown in FIG. 2.

Figure 6:
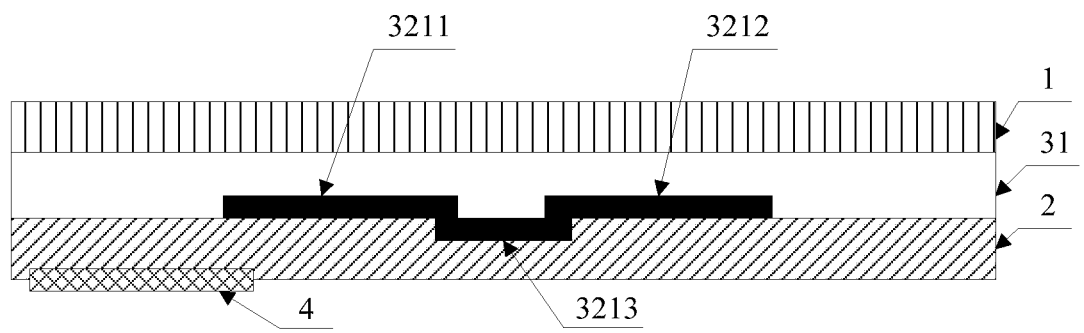
FIG. 6 is a schematic structural diagram of a metal wire provided by an embodiment of the present disclosure.

When the first auxiliary metal wire 3211 and the second auxiliary metal wire 3212 are arranged on the same layer, the metal jumper 3213 may be arranged on a layer different from that of them, for example, please refer to FIG. 5, which is a schematic structural diagram of a metal wire provided by an embodiment of the present disclosure, the first auxiliary metal wire 3211 and the second auxiliary metal wire 3212 are arranged on a surface of the second flexible circuit board 3 away from the first flexible circuit board 2, so the metal jumper 3213 may be arranged on a surface of the second flexible circuit board 3 close to the first flexible circuit board 2, the metal jumper 3213 may be electrically connected with the first auxiliary metal wire 3211 and the second auxiliary metal wire 3212 arranged on the layer different from that of the metal jumper through connecting holes, and surfaces of the first auxiliary metal wire 3211 and the second auxiliary metal wire 3212 may be usually covered with insulation layers. Or, as shown in FIG. 6, which is a schematic structural diagram of another metal wire provided by an embodiment of the present disclosure, the first auxiliary metal wire 3211 and the second auxiliary metal wire 3212 are arranged on a surface of a side of the base material layer 31 of the second flexible circuit board 3 close to the first flexible circuit board 2, correspondingly, the metal jumper 3213 is arranged on a surface of a side of the first flexible circuit board 2 close to the second flexible circuit board 3, and by making the two ends of the metal jumper 3213 be connected with one ends of the first auxiliary metal wire 3211 and the second auxiliary metal wire 3212 away from the metal bonding pads 322 respectively, being electrically connected with the first auxiliary metal wire 3211 and the second auxiliary metal wire 3212 is realized.

Figure 7:
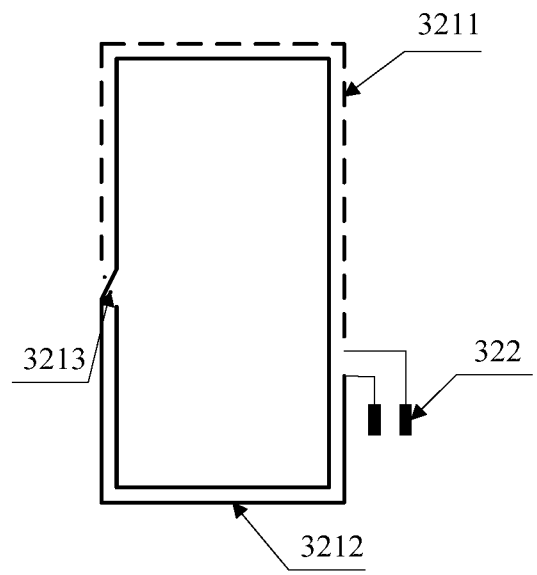
FIG. 7 is a schematic structural diagram of another metal wire provided by an embodiment of the present disclosure.

When the first auxiliary metal wire 3211 and the second auxiliary metal wire 3212 are arranged on different layers, as shown in FIG. 7, the metal jumper 3213 may be arranged on the same layer as the first auxiliary metal wire 3211 and arranged on a layer different from that of the second auxiliary metal wire 3212.

The first auxiliary metal wire 3211 and the second auxiliary metal wire 3212 are arranged on the same layer or different layers, and the metal jumper 3213 and at least one of the first auxiliary metal wire 3211 and the second auxiliary metal wire 3212 are arranged on different layers, so that wiring flexibility of the antenna coil 32 may be improved and the antenna coil 32 has a plurality of coils.

In some embodiments provided by the present disclosure, coil specifications of the plurality of antenna coils 32 are the same, and each coil specification includes a size of a coil, the number of turns of the coil, spacing of adjacent inner coil and outer coil or a leading-out position of the coil.

For example, as for four antenna coils 32 shown in FIG. 2, sizes of their coils, the number of turns of the coils, spacing between the coils, arrangement modes of the metal wires 321 in the antenna coils 32 and the like are all the same.

By arranging the coil specifications of the plurality of antenna coils 32 to be the same, impedances of all the antenna coils 32 may keep consistent, or within a set error range, signal energy sent by the near field communication circuit 4 through each antenna coil 32 is consistent.

Figure 8:
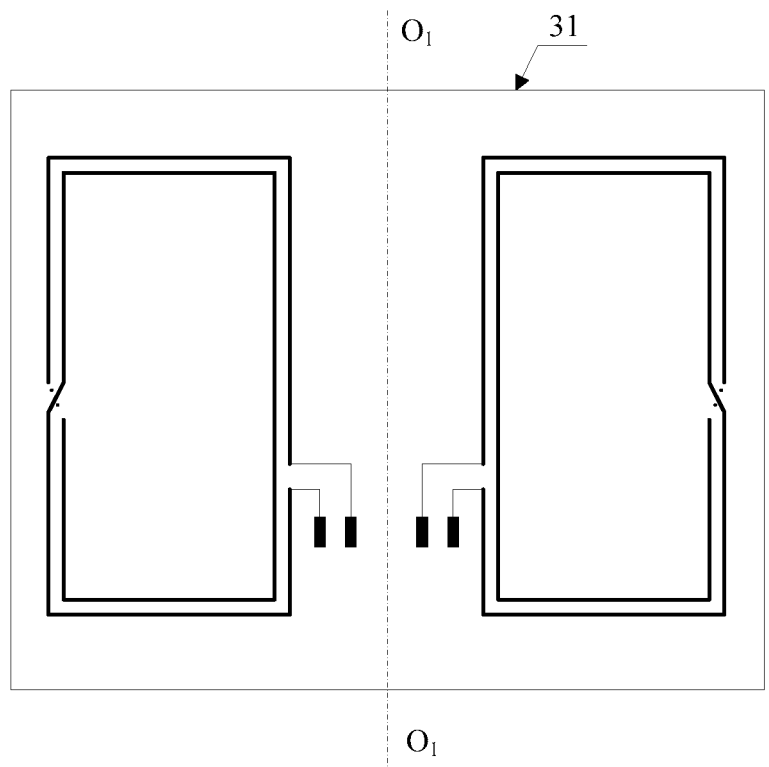
FIG. 8 is schematic diagram of distribution of a plurality of another antenna coils provided by an embodiment of the present disclosure.

As shown in FIG. 8, which is a schematic diagram of distribution of a plurality of another antenna coils provided by an embodiment of the present disclosure. Orthographic projections of the plurality of antenna coils 32 on the base material layer 31 do not overlap and are symmetrical relative to a center $O_1O_1$ line of the plurality of antenna coils 32, the center line is a straight line passing through a geometric center defined by the plurality of antenna coils 32 in a first direction, and the first direction is perpendicular to an arrangement direction of the plurality of antenna coils 32. If the plurality of antenna coils 32 are arranged in a straight line, the first direction is perpendicular to an extending direction of the straight line. If the plurality of antenna coils 32 are arranged in an array, an arrangement direction of the plurality of antenna coils 32 includes a column direction and a row direction of an array; when the arrangement direction is the row direction, the first direction is perpendicular to the row direction, and when the arrangement direction is the column direction, the first direction is perpendicular to the column direction, that is, when the plurality of antenna coils 32 are arranged in an array, the first direction actually contains two directions, and correspondingly, there are the plurality of antenna coils 32 and two center lines.

By arranging the orthographic projections of the plurality of antenna coils 32 on the base material layer 31 not to overlap, a recognition region may be increased, the antenna coils 32 are prevented from affecting one another, and the plurality of antenna coils 32 are arranged symmetrically relative to the center line, so that wiring may be convenient.

In some embodiments provided by the present disclosure, the plurality of antenna coils 32 may be located on the same surface of the base material layer 31, or the plurality of antenna coils 32 are distributed on two surfaces of the base material layer 31. In this way, the plurality of antenna coils 32 are flexibly arranged conveniently according to actual conditions.

Figure 9:
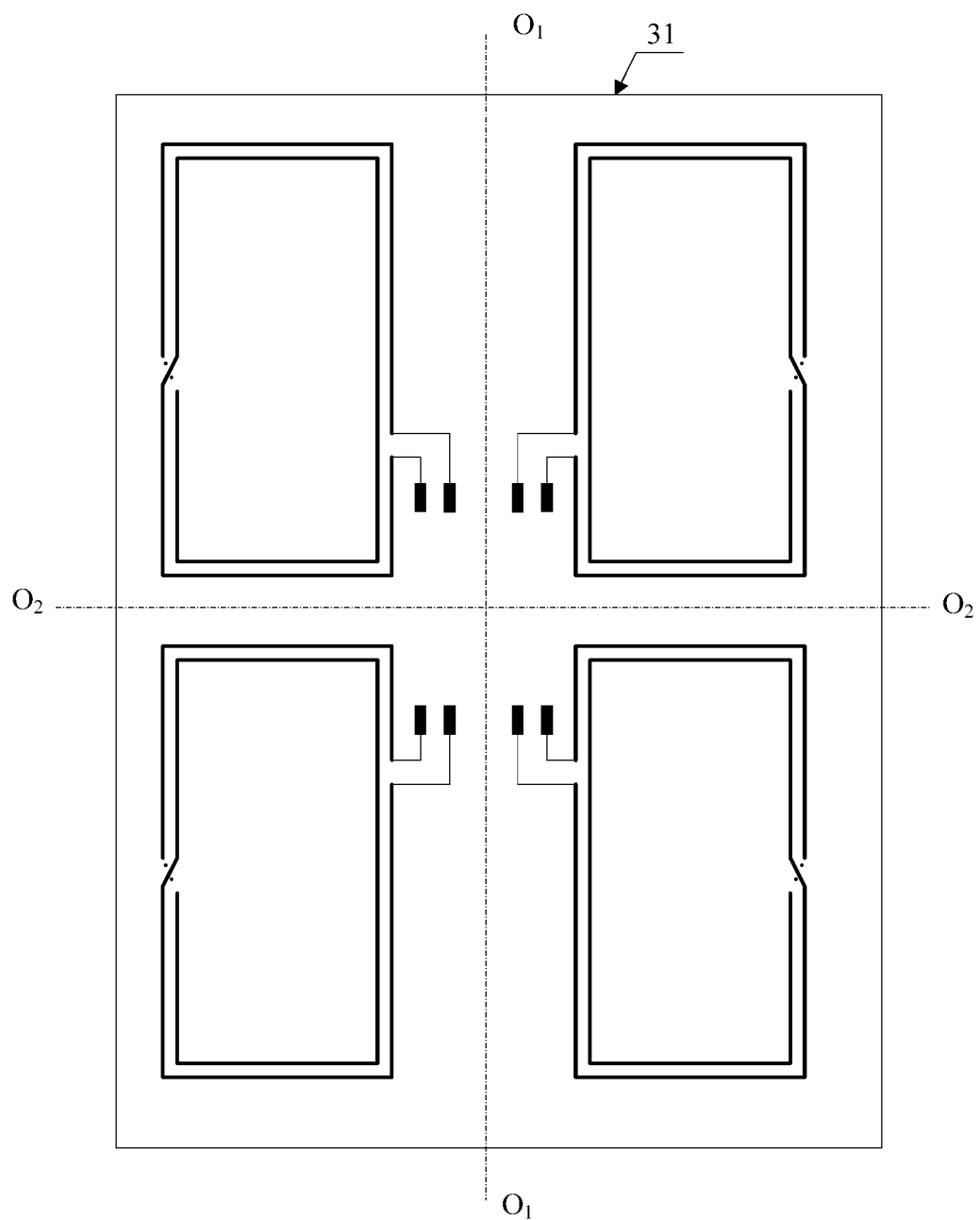
FIG. 9 is a schematic diagram of distribution of a plurality of another antenna coils provided by an embodiment of the present disclosure.

As shown in FIG. 9, which is a schematic diagram of distribution of a plurality of another antenna coils provided by an embodiment of the present disclosure. The metal bonding pads 322 of the plurality of antenna coils 32 are close to a geometric center of the plurality of antenna coils 32 and are symmetrical relative to the center line.

As shown in FIG. 9, the metal bonding pads 322 of four antenna coils 32 are symmetrical relative to a center line $O_1O_1$ and also symmetrical relative to a center line $O_2O_2$, the metal bonding pads 322 of the four antenna coils 32 are close to the geometric center (namely, an intersection point of $O_1O_1$ and $O_2O_2$) of the plurality of antenna coils 32.

By arranging the metal bonding pads of the plurality of antenna coils 32 to be close to the geometric center of the plurality of antenna coils 32 and symmetrical relative to the center line, a path length error between the four antenna coils 32 and the near field communication circuit 4 keeps within the smallest range, so that corresponding impedance when each antenna coil 32 is connected into the near field communication circuit 4 is within an error range (may be regarded as consistent impedance).

Figure 10:
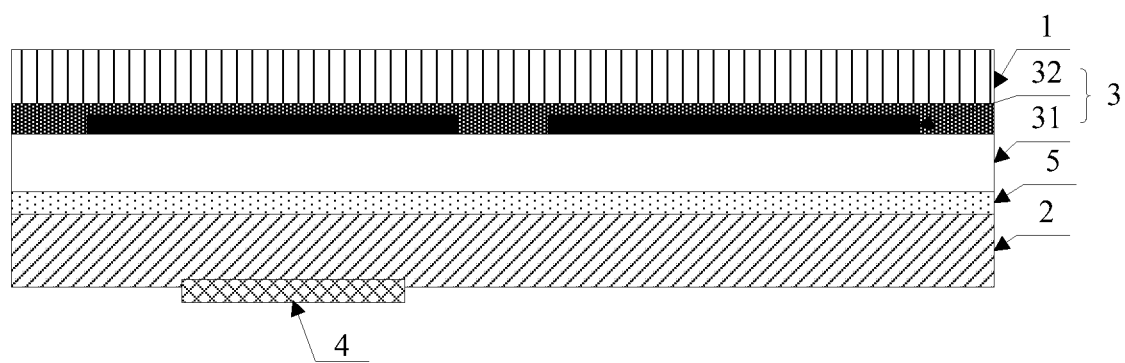
FIG. 10 is a schematic structural diagram of another display apparatus provided by an embodiment of the present disclosure.

As shown in FIG. 10, which is a schematic structural diagram of another display apparatus provided by an embodiment of the present disclosure. The display apparatus further includes:
  a shielding layer 5, stacked between the first flexible circuit board 2 and the second flexible circuit board 3 and configured to shield electromagnetic interference between the first flexible circuit board 2 and the plurality of antenna coils 32.

By means of the shielding layer 5 arranged between the first flexible circuit board 2 and the second flexible circuit board 3, signals between the first flexible circuit board 2 and the plurality of antenna coils 32 may be prevented from interfering with each other.

Figure 11:
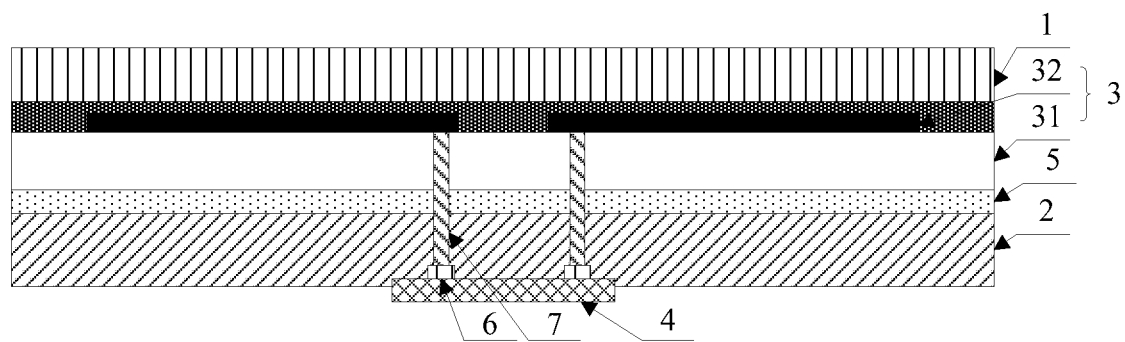
FIG. 11 is a schematic structural diagram of another display apparatus provided by an embodiment of the present disclosure.

As shown in FIG. 11, which is a schematic structural diagram of another display apparatus provided by an embodiment of the present disclosure. The display apparatus further includes:
  a plurality of antenna bonding pads 6, arranged on a surface of a side of the first flexible circuit board 2 away from the second flexible circuit board 3, wherein one surfaces of the antenna bonding pads 6 close to the second flexible circuit board 3 are electrically connected with the corresponding antenna coils 32, and one surfaces of the antenna bonding pads 6 away from the second flexible circuit board 3 are electrically connected with the near field communication circuit 4; and
  a plurality of connecting holes 7, being in one-to-one correspondence with the plurality of antenna bonding pads 6, wherein the connecting holes 7 penetrate through circuit boards between the corresponding antenna bonding pads 6 and the metal bonding pads 322. When the display apparatus further includes the shielding layer 5, the connecting holes 7 further penetrate through the shielding layer 5.

The plurality of antenna bonding pads 6 are arranged on the surface of the side of the first flexible circuit board 2 away from the second flexible circuit board 3 and the antenna bonding pads 6 and the corresponding antenna coils 32 are connected through the corresponding connecting holes 7, so that the plurality of antenna coils 32 may be electrically connected with the near field communication circuit 4, and the near field communication circuit 4 is conveniently arranged on the first flexible circuit board 2. The near field communication circuit 4 may also be arranged on other circuit boards, for example, on a main control panel of the display apparatus, and the antenna bonding pads 6 and the near field communication circuit 4 are connected through a conducting wire.

Figure 12:
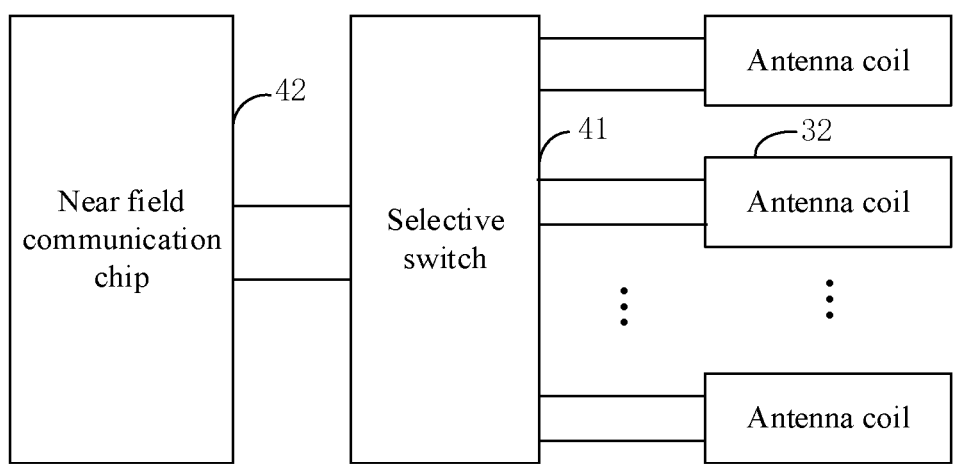
FIG. 12 is a principle diagram of a near field communication circuit provided by an embodiment of the present disclosure.

As shown in FIG. 12, which is a principle diagram of a near field communication circuit provided by an embodiment of the present disclosure, the near field communication circuit 4 includes:

a selective switch 41, wherein a plurality of first ends of the selective switch 41 are electrically connected with the plurality of antenna coils 32 respectively; and a near field communication chip 42, wherein a signal end of the near field communication chip 42 is electrically connected with a second end 412 of the selective switch 41, a signal control end (not shown in FIG. 12) of the near field communication chip 42 is electrically connected with a controlled end (not shown in FIG. 12) of the selective switch 41, the near field communication chip 42 outputs a selective signal to the selective switch 41 through the signal control end, and thus the selective switch 41 is electrically connected with the selected antenna coil 32 corresponding to the selective signal, and the signal end.

By means of the selective switch 41 arranged between the near field communication chip 42 and the plurality of antenna coils 32, the near field communication chip 42 may be electrically connected with a selected one of the plurality of antenna coils 32 by controlling the selective switch 41, so it is not needed to arrange the corresponding near field communication chip 42 for each antenna coil 32, and a technical effect of reducing cost is realized.

Figure 13:
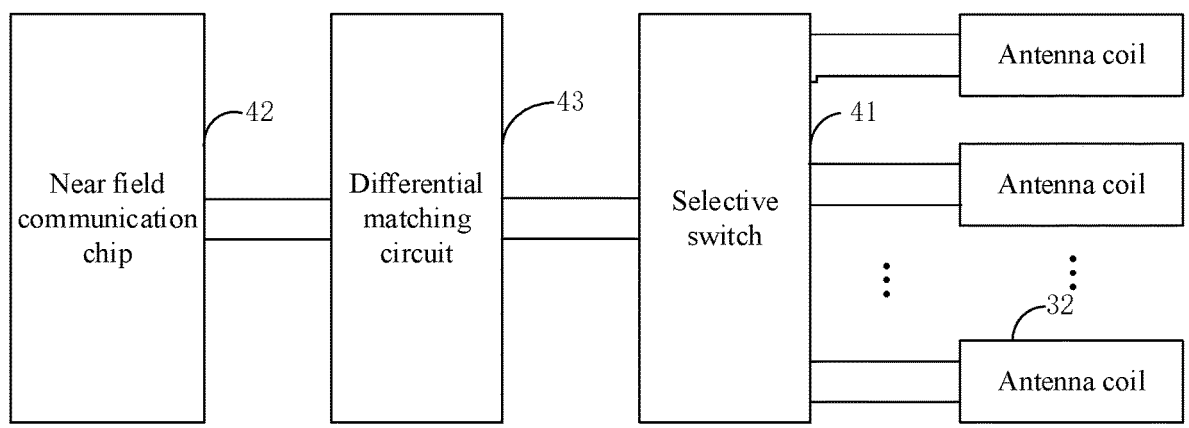
FIG. 13 is a principle diagram of another near field communication circuit provided by an embodiment of the present disclosure.

As shown in FIG. 13, which is a principle diagram of another near field communication circuit provided by an embodiment of the present disclosure, the near field communication circuit 4 further includes:

a differential matching circuit 43, wherein a first end of the differential matching circuit 43 is electrically connected with the signal end of the near field communication chip 42, a second end of the differential matching circuit 43 is electrically connected with a second end of a shift switch, and the differential matching circuit 43 is configured to adjust impedance between the near field communication chip 42 and the corresponding antenna coil 32 electrically connected therewith.

By means of the differential matching circuit 43 arranged between the near field communication chip 42 and the selective switch 41, though impedances accessing the plurality of antenna coils 32 are inconsistent, the impedances can still be adjusted through the differential matching circuit 43, so the impedances accessing the antenna coils 32 of the 42 keep consistent all the time.

Figure 14:
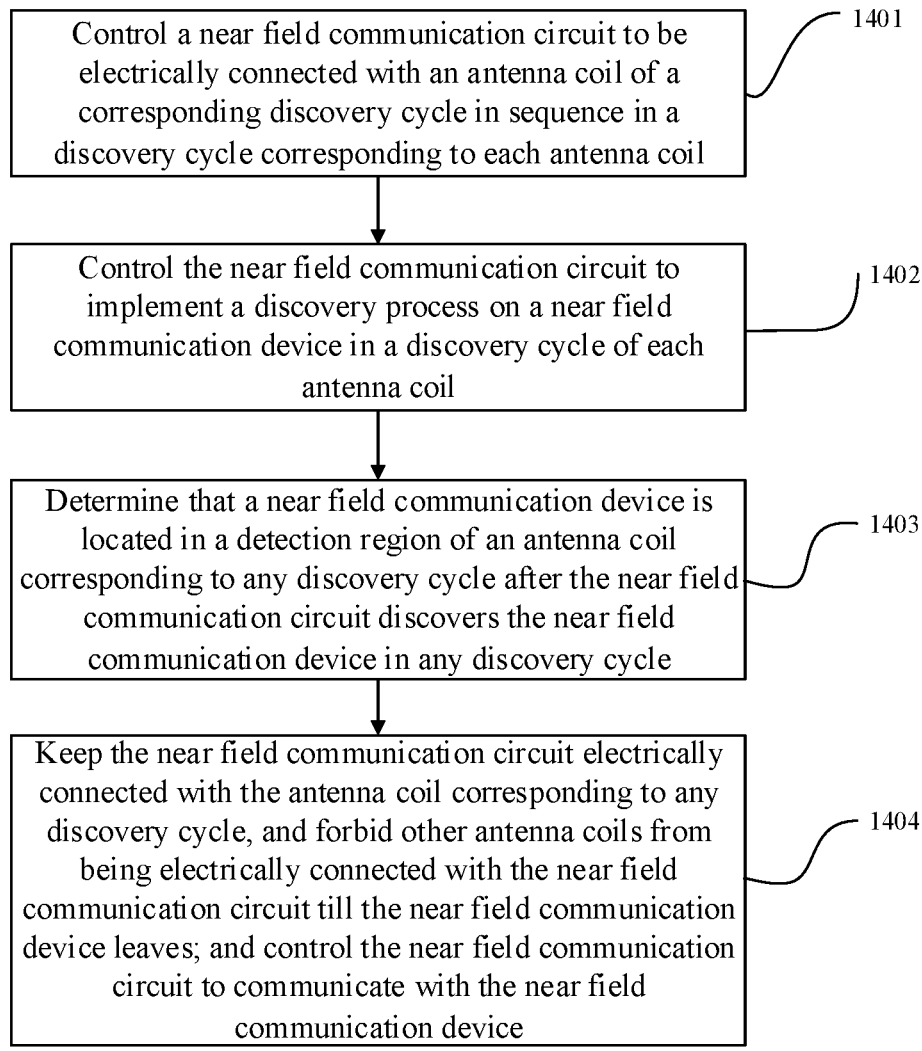
FIG. 14 is a flow chart of a control method of a display apparatus provided by an embodiment of the present disclosure.

Based on the same inventive concept, an embodiment of the present disclosure provides a control method of a display apparatus. A specific implementation of structural composition of the display apparatus may refer to description of an embodiment of the display apparatus, and repetitions are omitted. Please refer to FIG. 14, the control method includes:

step 1401, a near field communication circuit is controlled to be electrically connected with an antenna coil of a corresponding discovery cycle in sequence in a discovery cycle corresponding to each antenna coil;

before controlling the near field communication circuit to be electrically connected with the antenna coil of the corresponding discovery cycle in sequence in a discovery cycle corresponding to each antenna coil, the method further includes:

arranging a corresponding discovery cycle for each antenna coil, wherein discovery cycles of the different antenna coils are the same or not. The discovery cycle may be an integral multiple of a reference discovery cycle, and the reference discovery cycle is the smallest discovery cycle corresponding to an antenna coil.

Figure 15:
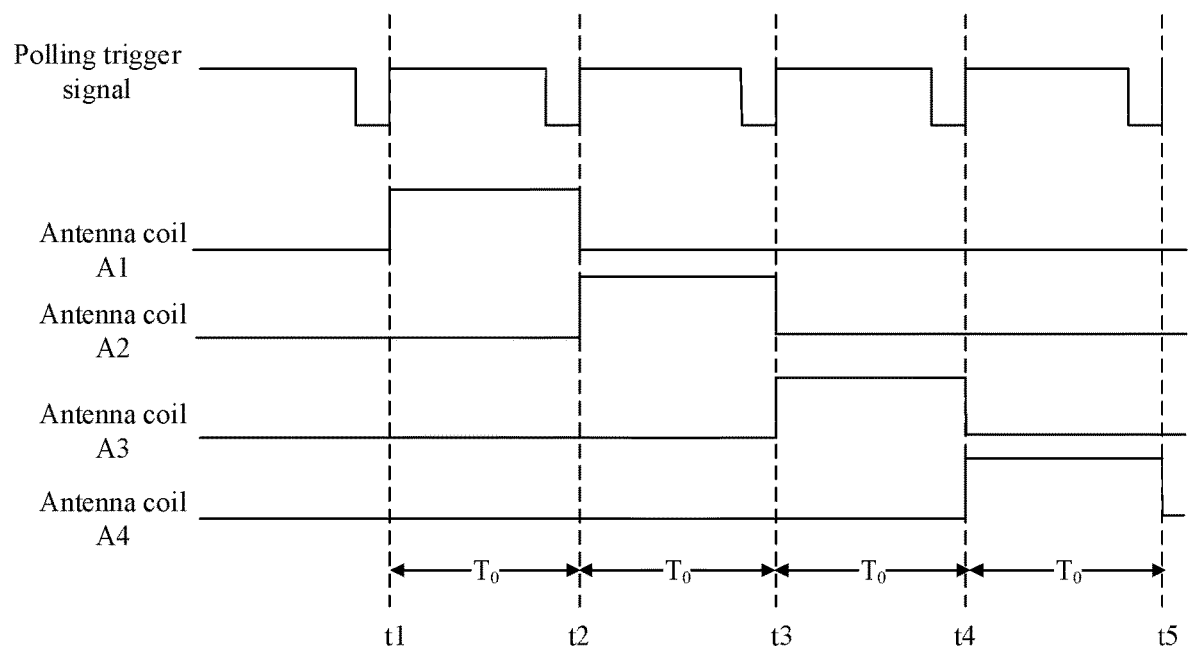
FIG. 15 is a schematic diagram of corresponding discovery cycles of antenna coils provided by an embodiment of the present disclosure.

For example, the reference discovery cycle is $T_0$, taking FIG. 2 as an example, discovery cycles corresponding to four antenna coils shown in FIG. 2 are recorded as $T_1$-$T_4$ in sequence, and the four discovery cycles may be the same, such as $T_0$ as shown in FIG. 15.

FIG. 15 is a schematic diagram of corresponding discovery cycles of antenna coils provided by an embodiment of the present disclosure. The discovery cycle $T_1$ of the antenna coil A1 corresponds to t1-t2, and the near field communication circuit is electrically connected with the antenna coil A1 in t1-t2; the discovery cycle $T_2$ of the antenna coil A2 corresponds to t2-t3, and the near field communication circuit is electrically connected with the antenna coil A2 in t2-t3; the discovery cycle $T_3$ of the antenna coil A3 corresponds to t3-t4, and the near field communication circuit is electrically connected with the antenna coil A3 in t3-t4; and the discovery cycle $T_4$ of the antenna coil A4 corresponds to t4-t5, and the near field communication circuit is electrically connected with the antenna coil A4 in t4-t5.

It may also be that $T_1=3T_0$, $T_2$-$T_4$ is $T_0$, may also be that $T_1=2T_0$, $T_2=3T_0$, $T_3=T_0$, $T_4=5T_0$, specifically, how long the discovery cycle corresponding to each antenna coil may be set according to actual demands and is not limited specifically.

By arranging the discovery cycles of all the antenna coils to be the same, the discovery process may be implemented in a corresponding detection region corresponding to each antenna coil in equal chance. By arranging the discovery cycles of the antenna coils not to be the same, the discovery cycle of the corresponding antenna coil may be set according to a probability of discovering the near field communication device in the detection region corresponding to each antenna coil, so that efficiency of discovering the near field communication device is improved.

After completing arrangement of the corresponding discovery cycles of the antenna coils, the near field communication circuit is controlled to be electrically connected with the antenna coil of the corresponding discovery cycle in sequence in the discovery cycle corresponding to each antenna coil according to a control instruction of an upper layer application in the display apparatus, and step 1402 to step 1403 are executed at the same time.

Step 1402: the near field communication circuit is controlled to implement a discovery process on a near field communication device in a discovery cycle of each antenna coil.

Step 1403: it is determined that the near field communication device is located in a detection region of an antenna coil corresponding to any discovery cycle after the near field communication circuit discovers the near field communication device in any discovery cycle.

Controlling the near field communication circuit to implement a discovery process on a communication target in a discovery cycle of each antenna coil may be implemented in the following mode:

the discovery cycle includes a polling cycle and a monitoring cycle; the near field communication circuit is controlled to send a polling signal to a surrounding near field communication device in the polling cycle; in the monitoring cycle, whether a response signal of the polling signal is received is monitored; and it is determined that the near field communication device is discovered in the corresponding discovery cycle if the response signal is received.

Figure 16:
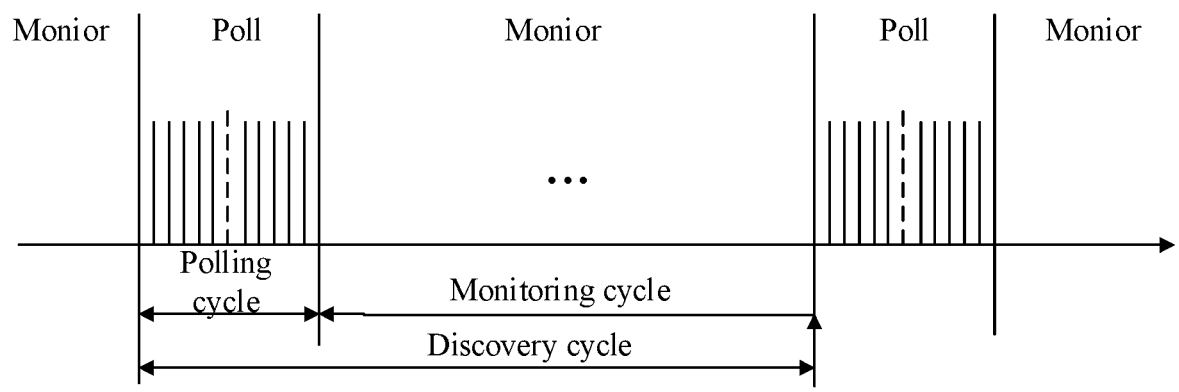
FIG. 16 is a schematic diagram of a discovery cycle provided by an embodiment of the present disclosure.

As shown in FIG. 16, which is a schematic diagram of a discovery cycle provided by an embodiment of the present disclosure. The discovery cycle includes the polling cycle and the monitoring cycle; in the polling cycle, the near field communication circuit sends the polling signal to the near field communication device in the corresponding detection region through the antenna coil electrically connected therewith; after the near field communication device in the detection region receives the above polling signal, the response signal based on the polling signal is sent to the near field communication circuit; if the near field communication circuit receives the response signal sent by the near field communication device in the monitoring cycle, it is determined that there is the near field communication device in the discovery cycle, through which antenna coil the near field communication device is discovered may be determined according to the antenna coil corresponding to the discovery cycle, and then step 1404 may be executed.

Step 1404: the near field communication circuit keeps electrically connected with the antenna coil corresponding to any discovery cycle, and other antenna coils are forbidden from being electrically connected with the near field communication circuit till the near field communication device leaves; and the near field communication circuit is controlled to communicate with the near field communication device.

Figure 17:
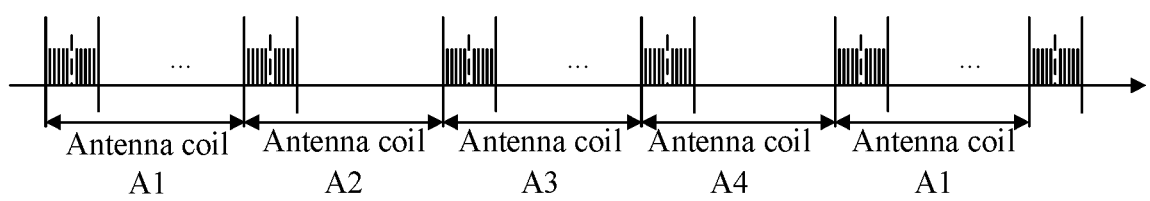
FIG. 17 is a sequence chart of discovery cycles of a plurality of antenna coils provided by an embodiment of the present disclosure.

For example, the near field communication circuit is controlled to be electrically connected with the antenna coil A1 to the antenna coil A4 in sequence and implement the corresponding discovery process, which is shown in a timing sequence as shown in FIG. 17, which is a sequence chart of discovery cycles of a plurality of antenna coils provided by an embodiment of the present disclosure. The near field communication circuit is first electrically connected with the antenna coil A1 and implements the discovery process (including polling and monitoring) in the discovery cycle of the antenna coil A1; after the discovery cycle corresponding to the antenna coil A1 is finished, the near field communication circuit is electrically connected with the antenna coil A2, and it enters the discovery cycle corresponding to the antenna coil A2 to implement the discovery process; after the discovery cycle corresponding to the antenna coil A2 is finished, the near field communication circuit is electrically connected with the antenna coil A3, it enters the discovery cycle corresponding to the antenna coil A3 to implement the discovery process; after the discovery cycle corresponding to the antenna coil A3 is finished, the near field communication circuit is electrically connected with the antenna coil A4, it enters the discovery cycle corresponding to the antenna coil A4 to implement the discovery process; and after the discovery cycle corresponding to the antenna coil A4 is finished, the near field communication circuit is electrically connected with the antenna coil A1 again, it enters the discovery cycle corresponding to the antenna coil A1 to implement the discovery process, and so on till the near field communication device is discovered in a certain discovery cycle, or a control instruction is received to stop the discovery process.

Hypothetically, in the above discovery process, the near field communication device is discovered in the discovery cycle corresponding to the antenna coil A3, the near field communication circuit is controlled to keep electrically connected with the antenna coil A3, and the near field communication circuit is forbidden from being electrically connected with the antenna coil A1, the antenna coil A2 and the antenna coil A3 till the near field communication device leaves the detection region of the antenna coil A3.

In a possible implementation, the controlling the near field communication circuit to communicate with the near field communication device may also be implemented in the following mode:

the near field communication circuit is controlled to communicate with a plurality of near field communication devices respectively in a mode of polling the plurality of near field communication devices if the plurality of near field communication devices are discovered in the corresponding discovery cycle.

For example, three near field communication devices are discovered in the discovery cycle of the antenna coil A3, the near field communication circuit is controlled to keep electrically connected with the antenna coil A3, the other antenna coils are forbidden from being electrically connected with the near field communication circuit, and the near field communication circuit may be controlled to communicate with the three near field communication devices in a polling mode.

It needs to be noted that dividing of units is illustrative in some embodiments of the present application, which is only dividing for a logical function, but in actual discovery, there may be other dividing modes. Besides, all functional units in all the embodiments of the present application may be integrated into one processing unit, or each unit may exist physically independently, or two or more than two units may also be integrated in one unit. The above integrated units may be implemented in a form of hardware or a software functional unit.

The integrated units, implemented in the form of the software functional unit and sold or used as an independent product, may be stored in a processor readable storage medium. Based on this understanding, the technical solution of the present application may be essentially embodied in a form of a software product, or a part making a contribution to the prior art or all or a part of the technical solution may be embodied in the form of the software product, the computer software product is stored in a storage medium and includes a plurality of instructions used to make one computer device (may be a personal computer, a server, or a network device and the like) or a processor execute all or a part of steps of the method in each embodiment of the present application. The above storage medium includes: a USB flash disk, a mobile hard disk drive, a read-only memory (ROM), a random access memory (RAM), a diskette, or an optical disc and various media capable of storing program codes.

It needs to be noted here that the above apparatus provided by the embodiment of the present disclosure can implement all method steps implemented in the above embodiment of the method and can achieve the same technical effect, and the same part and beneficial effects in some embodiments as the embodiment of the method are not specifically described here.

Those skilled in the art should understand that the embodiments of the present disclosure may be provided as a method, a system, or a program product. Therefore, the embodiment of the present disclosure may adopt a form of an embodiment of only hardware, only software, or combining software and hardware. Besides, the embodiment of the present disclosure may adopt a form of a computer program product implemented in one or more readable storage media (including but not limited to a magnetic disk memory, a CD-ROM, an optical memory and the like) containing computer/processor applicable program codes.

The embodiments of the present disclosure are described with reference to flow charts and/or block diagrams of a method, a device (system) and a computer program product according to the embodiments of the present disclosure. It should be understood that each flow and/or block in the flow charts and/or block diagrams, and a combination of flows and/or blocks in the flow charts and/or blocks may be implemented through computer program instructions. These program instructions may be provided onto a processor of a general-purpose computer, a special-purpose computer, an embedded processor or other programmable data processing devices so as to generate a machine, so that the instructions executed by the processor of the computer or the other programmable data processing devices generate an apparatus for implementing functions specified in one or more flows in the flow charts and/or one or more blocks in the block diagrams.

These program instructions may also be stored in a readable memory capable of guiding the computer or the other programmable data processing devices to work in a specific mode, so that the instructions stored in the readable memory generate a manufacture including an instruction apparatus, and the instruction apparatus implements the functions specified in one or more flows and/or one or more blocks in the block diagrams.

These program instructions may also be loaded onto the computer or the other programmable data processing devices, so that a series of operation steps are executed on the computer or the other programmable devices to generate processing implemented by the computer/the processor, and thus the instructions executed on the computer/processor or the other programmable devices provide steps for implementing the functions specified in one or more flows in the flow charts and/or one or more blocks in the block diagrams.

Apparently, those skilled in the art may make various changes and variations to the present disclosure without departing from the spirit and scope of the present disclosure. In this case, if these changes and variations of the present disclosure fall within the scope of the claims of the present disclosure and their equivalents, the present disclosure also intends to contain these changes and variations.

What is claimed is:

1. A display apparatus, comprising a display panel, a first flexible circuit board and a main control panel, wherein the main control panel is electrically connected with the display panel through the first flexible circuit board, the first flexible circuit board is arranged on a back face of the display panel, and the display apparatus further comprises:
    a second flexible circuit board comprising a base material layer and a plurality of antenna coils arranged on a side of the base material layer, wherein each of the plurality of antenna coils corresponds to a detection region; and
    a near field communication circuit arranged on a circuit board different from the second flexible circuit board, wherein the near field communication circuit is configured to select one of the plurality of antenna coils for use at a same moment.

2. The display apparatus according to claim 1, wherein the second flexible circuit board is arranged on a side close to the display panel, of the first flexible circuit board.

3. The display apparatus according to claim 1, wherein coil specifications of the plurality of antenna coils are the same, and the coil specification comprise a size of a coil, a quantity of turns of the coil, spacing of adjacent inner coil and outer coil, or a leading-out position of the coil.

4. The display apparatus according to claim 3, wherein orthographic projections of the plurality of antenna coils on the base material layer do not overlap and are symmetrical relative to a center line of the plurality of antenna coils, the center line is a straight line passing through a geometric center defined by the plurality of antenna coils in a first direction, and the first direction is perpendicular to an arrangement direction of the plurality of antenna coils.

5. The display apparatus according to claim 4, wherein the plurality of antenna coils are located on the same surface of the base material layer, or the plurality of antenna coils are distributed on two surfaces of the base material layer.

6. The display apparatus according to claim 4, wherein metal bonding pads of the plurality of antenna coils are close to the geometric center of the plurality of antenna coils and are symmetrical relative to the center line.

7. The display apparatus according to claim 3, further comprising:
    a shielding layer stacked between the first flexible circuit board and the second flexible circuit board and configured to shield electromagnetic interference between the first flexible circuit board and the plurality of antenna coils.

8. The display apparatus according to claims 1, wherein the first flexible circuit board comprises:
    a plurality of antenna bonding pads arranged on a side away from the second flexible circuit board, of the first flexible circuit board, wherein a side close to the second flexible circuit board, of the antenna bonding pads are electrically connected with corresponding antenna coils, and a side away from the second flexible circuit board, of the antenna bonding pads are electrically connected with the near field communication circuit; and
    a plurality of connecting holes being in one-to-one correspondence with the plurality of antenna bonding pads, wherein the connecting holes penetrate through circuit boards between the antenna bonding pads and the metal bonding pads.

9. The display apparatus according to claims 1, wherein the near field communication circuit comprises:
    a selective switch, wherein a plurality of first ends of the selective switch are electrically connected with the plurality of antenna coils respectively; and
    a near field communication chip, wherein a signal end of the near field communication chip is electrically connected with a second end of the selective switch, a signal control end of the near field communication chip is electrically connected with a controlled end of the selective switch, the near field communication chip outputs a selective signal to the selective switch through the signal control end, so that the selective switch is electrically connected with the selected antenna coil corresponding to the selective signal, and the signal end.

10. The display apparatus according to claim 9, wherein the near field communication circuit is arranged on the first flexible circuit board or the main control panel.

11. The display apparatus according to claim 9, wherein the near field communication circuit further comprises:
    a differential matching circuit, wherein a first end of the differential matching circuit is electrically connected with the signal end of the near field communication chip, a second end of the differential matching circuit is electrically connected with a second end of a shift switch, and the differential matching circuit is configured to adjust impedance between the near field communication chip and a corresponding antenna coil electrically connected therewith.

12. A control method of the display apparatus according to claims 1, comprising:
controlling the near field communication circuit to be electrically connected with an antenna coil of a corresponding discovery cycle in sequence in a discovery cycle corresponding to each antenna coil;
controlling the near field communication circuit to implement a discovery process on a near field communication device in a discovery cycle of each antenna coil;
determining that a near field communication device is located in a detection region of an antenna coil corresponding to any discovery cycle after the near field communication circuit discovers the near field communication device in any discovery cycle;
keeping the near field communication circuit electrically connected with the antenna coil corresponding to any discovery cycle, and forbidding other antenna coils from being electrically connected with the near field communication circuit till the near field communication device leaves; and controlling the near field communication circuit to communicate with the near field communication device.

13. The control method according to claim 12, wherein before controlling the near field communication circuit to be electrically connected with the antenna coil of the corresponding discovery cycle in sequence in a discovery cycle corresponding to each antenna coil, the method further comprises:
arranging a corresponding discovery cycle for each antenna coil, wherein discovery cycles of the different antenna coils are the same or not.

14. The control method according to claim 13, wherein the discovery cycle is an integral multiple of a reference discovery cycle, and the reference discovery cycle is a smallest discovery cycle corresponding to an antenna coil.

15. The control method according to claims 12, wherein the controlling the near field communication circuit to implement a discovery process on a communication target in a discovery cycle of each antenna coil comprises:
the discovery cycle comprising a polling cycle and a monitoring cycle;
controlling the near field communication circuit to send a polling signal to a surrounding near field communication device in the polling cycle;
monitoring, in the monitoring cycle, whether a response signal of the polling signal is received; and
determining that the near field communication device is discovered in the corresponding discovery cycle if the response signal is received.

16. The control method according to claim 15, wherein the controlling the near field communication circuit to communicate with the near field communication device comprises:
controlling the near field communication circuit to communicate with a plurality of near field communication devices respectively in a mode of polling the plurality of near field communication devices if the plurality of near field communication devices are discovered in the corresponding discovery cycle.

* * * * *